US008272198B1

(12) United States Patent
Allochis

(10) Patent No.: US 8,272,198 B1
(45) Date of Patent: Sep. 25, 2012

(54) FLEXIBLE PLATFORM JOINTED TO A CONVEYOR BELT FOR A COMBINE HARVESTING, CHOPPING AND SPINNING MACHINE

(76) Inventor: José Luis Allochis, Buenos Aires (AR)

( * ) Notice: Subject to any disclaimer, the term of this patent is extended or adjusted under 35 U.S.C. 154(b) by 0 days.

(21) Appl. No.: 13/153,646

(22) Filed: Jun. 6, 2011

(51) Int. Cl.
*A01D 43/00* (2006.01)
*A01D 57/00* (2006.01)

(52) U.S. Cl. .......... 56/153; 56/192

(58) Field of Classification Search .......... 56/15.8, 56/153, 181, 192, 345
See application file for complete search history.

(56) References Cited

U.S. PATENT DOCUMENTS 2,253,044 A * 8/1941 Ommodt .......... 56/14.4
2,999,348 A * 9/1961 Cunningham .......... 56/16.4 R
3,468,107 A * 9/1969 van der Lely .......... 56/11.9
4,177,626 A * 12/1979 McNaught .......... 56/14.5
4,446,683 A * 5/1984 Rempel et al. .......... 56/296
4,487,004 A * 12/1984 Kejr .......... 56/14.4
4,956,966 A * 9/1990 Patterson .......... 56/181
5,005,343 A * 4/1991 Patterson .......... 56/14.4
5,464,371 A * 11/1995 Honey .......... 460/20
6,675,568 B2 * 1/2004 Patterson et al. .......... 56/208
7,478,521 B2 * 1/2009 Coers et al. .......... 56/208
7,614,206 B2 * 11/2009 Tippery et al. .......... 56/15.8
7,640,720 B1 * 1/2010 Lovett et al. .......... 56/181
7,669,396 B2 * 3/2010 Eagles et al. .......... 56/153
7,788,891 B2 * 9/2010 Puryk et al. .......... 56/181
7,937,919 B2 * 5/2011 Coers et al. .......... 56/15.8
7,992,372 B1 * 8/2011 Coers et al. .......... 56/153
2002/0129591 A1 * 9/2002 Patterson et al. .......... 56/158
2008/0072560 A1 * 3/2008 Talbot .......... 56/208
2008/0276590 A1 * 11/2008 Sauerwein et al. .......... 56/153
2008/0295473 A1 * 12/2008 Tippery et al. .......... 56/14.5
2008/0295474 A1 * 12/2008 Tippery et al. .......... 56/14.5
2009/0084080 A1 * 4/2009 Coers et al. .......... 56/15.8

* cited by examiner

*Primary Examiner* — Thomas B Will
*Assistant Examiner* — Joan D Misa
(74) *Attorney, Agent, or Firm* — DeFillo & Associates Inc.; Evelyn A. DeFillo

(57) ABSTRACT

A flexible platform jointed to a conveyor belt for a harvesting, spinning, and chopping machine which improves the functioning of all the platforms width, and eliminating deficiencies related to material, cereal or grain transport, with a transporting auger in all its width, obtaining a more homogeneous and smoother material flow. The platform includes two conveyor belts (1,2) adjacent and parallel to each other. The conveyor belt (1) is movable and flexible and is located adjacent to the cutting blades. The conveyor belts (1,2) are located between central corresponding augers (3, 4) and retractile central fingers (5), facing the feeder.

7 Claims, 7 Drawing Sheets

FIG. 4a
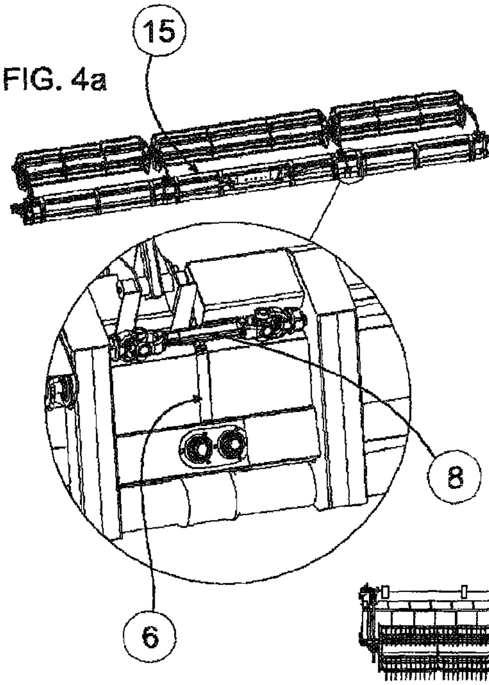
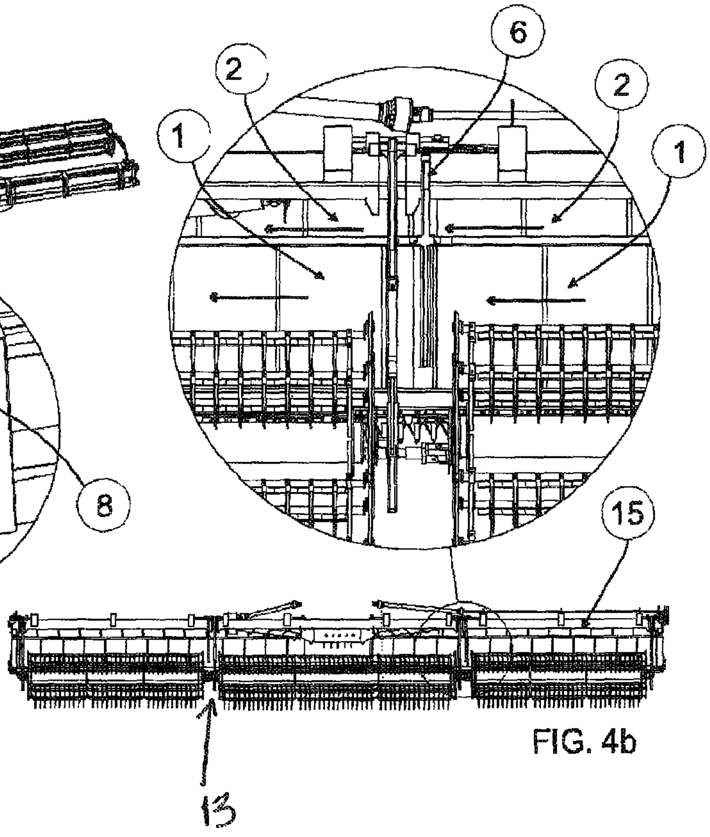
FIG. 4b

FLEXIBLE PLATFORM JOINTED TO A CONVEYOR BELT FOR A COMBINE HARVESTING, CHOPPING AND SPINNING MACHINE

TECHNICAL FIELD

The present invention relates to a flexible platform jointed to a conveyor belt for a harvesting, spinning, and chopping machine which improves the functioning of all the platform width, and eliminates deficiencies related to the material, cereal or grain transport, with a transporting auger in all its width, obtaining a more homogeneous and smoother material flow.

BACKGROUND OF THE INVENTION

In regards to the previous art of the present invention, it is worth highlighting platforms with transporting augers and conveyor belt platforms or canvas, as they were named in the past, which were rigid or without movement, except from its own turn, in all its length and without the possibility of copying the land in which they worked. This aforementioned canvas consisted of a conveyor belt on each side of the feeder and a central vertical belt.

It is worth mentioning that for some cereal harvesting or products, the aforementioned conveyor belts have to be flexible, that is to say, they must allow the belt to take such an angle that it must copy the land and said form to adapt to land irregularities, being one of the main objectives of the present invention to develop a cutting platform which fulfills the demands of farming in lands with irregularities.

The proposed platform in a preferential embodiment is built with high technology materials and low weight materials such as steel, plastic and aluminum or such material's alloys.

The present platform is developed with several conveyor belts, located parallel to one another on each lateral side of said platform, back belts being rigid or without movement (except for the belt's own turn) regardless of the land where it works; existing front conveyor belts, which bend or joint in relation to the back conveyor belts, allowing to change its position and accepting land irregularities.

In a preferential embodiment, the proposed platform allows turn revolutions or belt velocity to be the same or different in back conveyor belts in relation to the belts' velocity of the front belts, likewise allowing it to be of a different width, length or material and to have different shapes.

The back conveyor belt and the front conveyor belt will carry the cereal, grain or material towards the central auger of the platform, where it will be taken by an auger on each side and respective retractile fingers.

Likewise, the cutting system is also synchronized to eliminate cutting-blade vibration, for that reason it was built with a gear-box and a control gear, in order not to be slipped or moved in both sides.

The conveyor belts can be activated mechanically or hydraulically, with any of the mechanisms known today to give movement to these types of belts.

By being the flexible front conveyor belt, it can vary its angle in relation to the back conveyor belt, having up to 200 mm trajectory.

SUMMARY OF THE INVENTION

In one aspect of the present invention, a flexible platform jointed to a conveyor belt for a combined harvesting, chopping and spinning machine includes two adjacent parallel conveyor belts. The conveyor belt adjacent to the cutting blade is movable in relation to the other belt.

These and other features, aspects and advantages of the present invention will become better understood with reference to the following drawings, description and claims.

BRIEF DESCRIPTION OF THE DRAWINGS

In order for this present invention to be clearly understood and taken into practice easily, it has been presented in one of its preferred embodiments in the illustrative drawings and not limitative in which:

FIGS. 3, 4 and 5 show a plurality of jointed platforms and amplifying details of aforesaid figures;

In aforementioned figures, the reference numbers indicate same or corresponding elements of the invention.

DETAILED DESCRIPTION OF THE INVENTION

Figure 1:
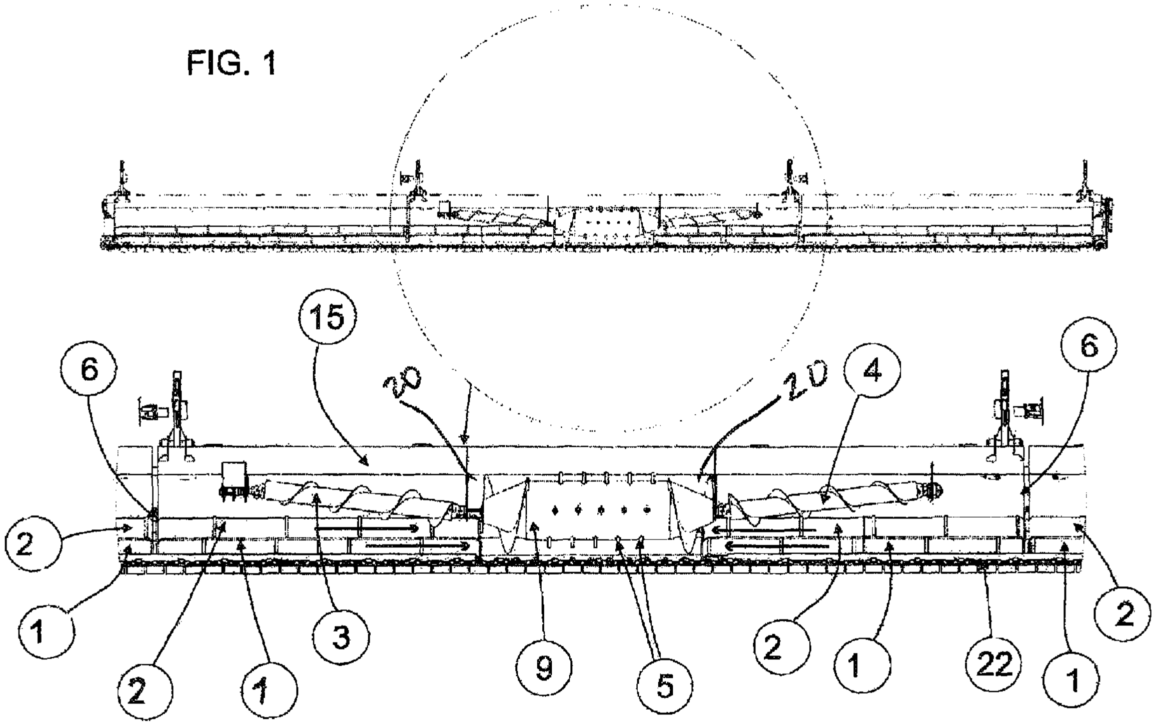
FIG. 1 shows a perspective front view of the flexible platform of the present invention and an amplifying detail of the same according to an exemplary embodiment of the present invention.

It is observed in FIGS. 1 to 7 a platform 15 having a first conveyor belt 1 and a second conveyor belt 2, which are turned by rollers located in their ends. The first conveyor belt 1 and the second conveyor belt 2 move the cereal towards the center of the platform 15, where augers 3 and auger 4 are located. Retractable fingers Stake the cereal to the harvester feeder 20.

The second conveyor belt 2, has a rigid belt, without movement except from its own turn. The first conveyor belt 1 is located adjacent to the second conveyor belt 2. The first conveyor belt 1, which apart from its own turning movement, has flexibility and includes movement with regards to the second conveyor belt 2 that allows to adapt to the land irregularities.

It is evident that the number of first conveyor belts 1 and the second conveyor belts 2, depends on the width of the platform 15. In one embodiment, the platform 15 include a first conveyor belt 1 and a second conveyor belt 2 on each side of the feeder 20. As aforementioned, the platform 15 contains two augers 3 and 4, and retractable fingers 5.

Figure 7:
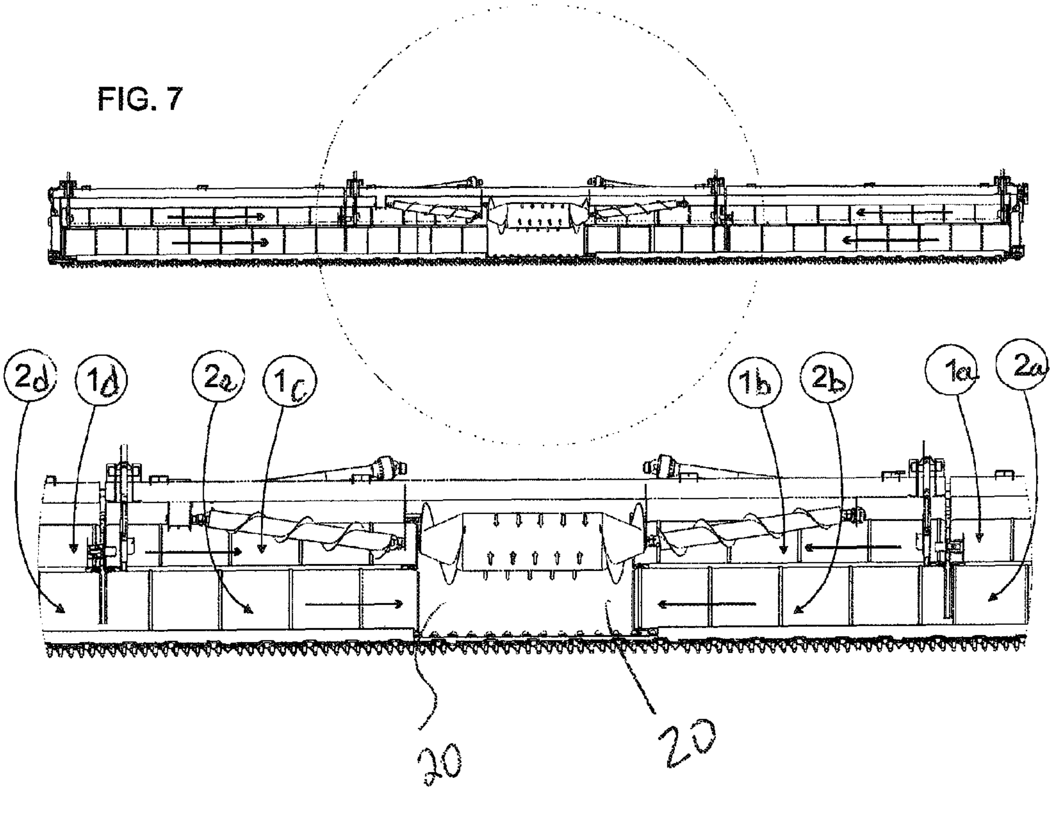
FIG. 7 shows a perspective front view of the flexible platform according to another exemplary embodiment of the present invention showing more than one first conveyor belt and more than one second conveyor belt.

In the embodiment show on FIG. 7, when the platform 15 is wider than 10.50 meters (35 feet), the platform 15 includes two first conveyor belts 1*a*, 1*b* and two second conveyor belts 2*a*, 2*b* placed on one side of the platform 15 and two first conveyor belts 1*c*, 1*d* and two second conveyor belts 2*c*, 2*d* on the other side of the platform 15. This is also the case for an articulated flexible platform, since it is so wide that using only one first conveyor belt 1 and one second conveyor belt is not enough to cover the land irregularities. In this case, joints 6 are placed on the left and right sides as it is shown in FIG. 4. This joint 6 is activate by a pneumatic pump, hydraulic pump, or it can be a mechanical joint FIG. 2.

The present platform 15 includes a first conveyor belt 1 and a second conveyor belt 2, which differs from the currently known platforms that have a belt on each side with the total width of the first conveyor belt 1 plus the one of the second conveyor belt 2.

Figures 2A, 2B:
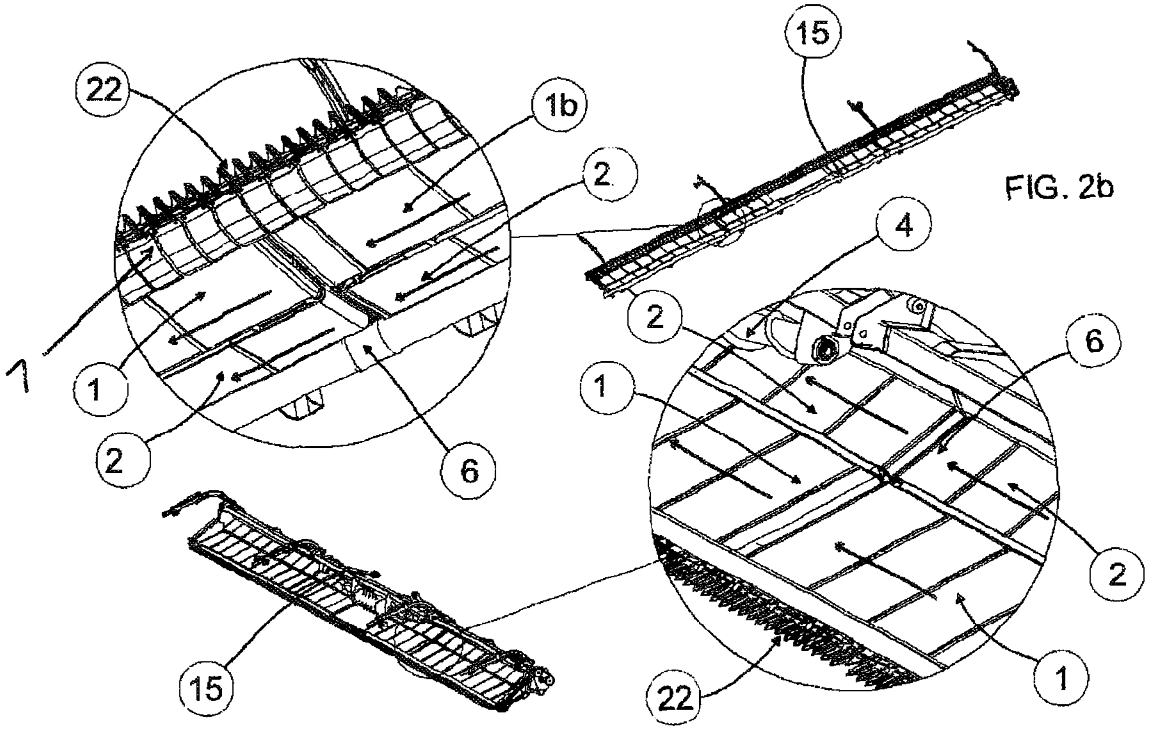
FIGS. 2*a* and 2*b* show detailed view of FIG. 1 showing the details of a platform
Figure 3:
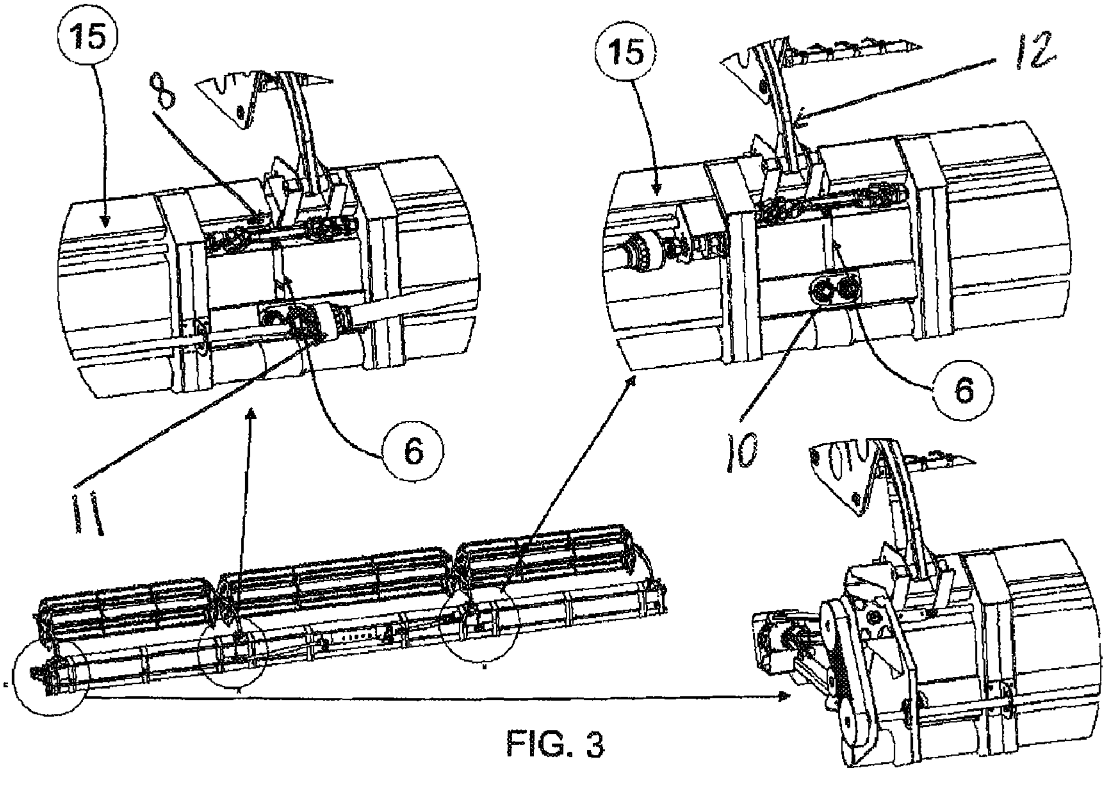
Figure 5:
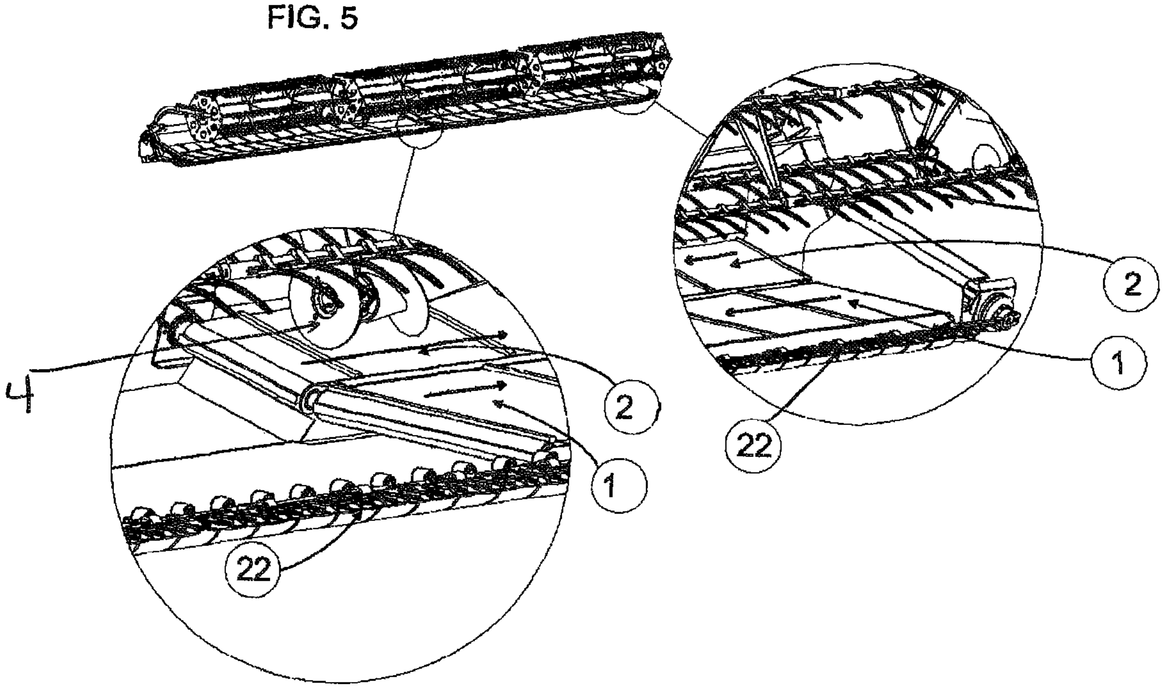
Figure 6:
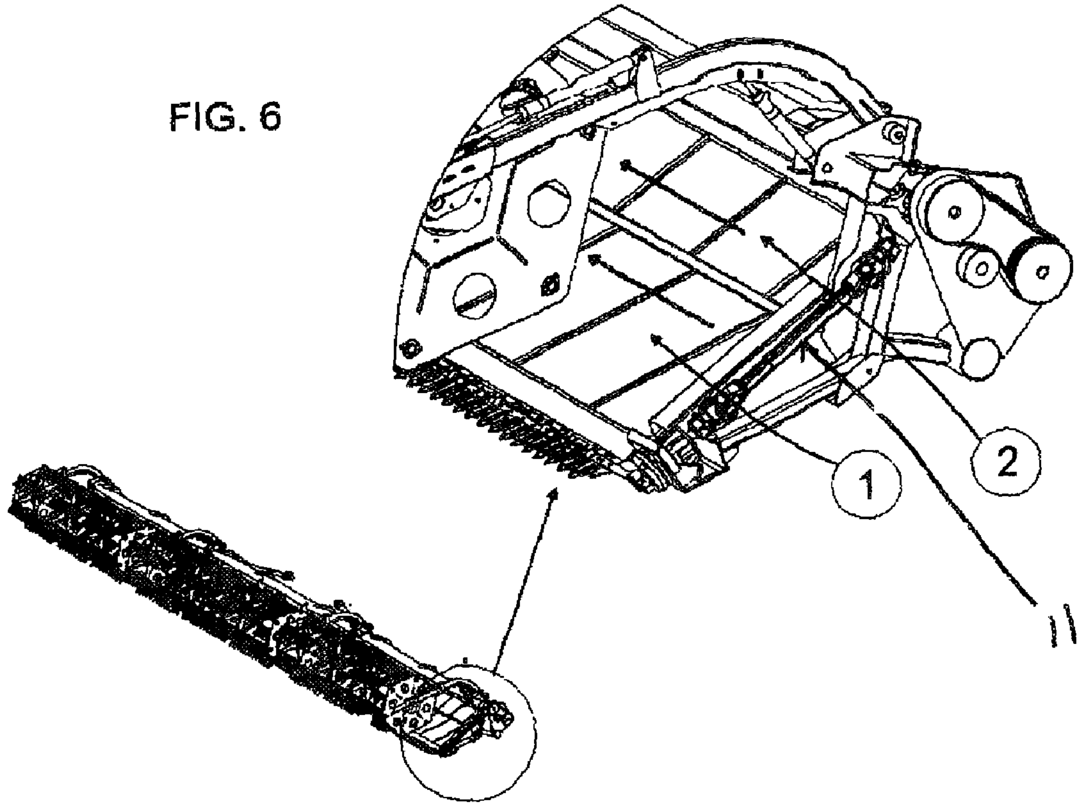
FIG. 6 shows a perspective of the control box and of the blades and the activation of the same.

Likewise, in mentioned FIGS. 2*a* 2*b* it is possible to use skids 7 wherein the joint 6 and the pneumatic pump or hydraulic pump is leaned on the ground. In FIG. 3 a control gear 8 is shown, which allows to synchronize the cutting blades 22 with an axis that goes from the chassis' one side to the other, central auger 9, conveyor belts' commands 10, blades-box's command 11 and finally the support mill base 12.

In FIG. 4 it is possible to additionally observe the joint 6 of both laterals 13.

What is claimed is:

1. A flexible platform for a combined harvesting, chopping, and spinning machine comprising:

a platform having a first side and a second side;

a central auger located on the first side of the platform;

cutting blades located on the second side of the platform;

a first auger connected to a first side of the central auger;

a second auger connected to a second side of the central auger;

a first conveyor belt located on each one of the sides of the central auger;

a second conveyor belt located on each one of the sides of the central auger, each second conveyor belt is placed in parallel and adjacent to the corresponding first conveyor belt;

each second conveyor belt is rigid and moves in only one direction towards the central auger;

each first conveyor belt is flexible and moves in one direction towards the central auger and also moves in relation to the corresponding second conveyor belt; and each first conveyor belt is located between the cutting blades and the corresponding second conveyor belt.

2. The flexible platform according to claim 1, wherein each first conveyor belt moves at a speed different from a speed of the corresponding second conveyor belt.

3. The flexible platform according to claim 1, wherein each first conveyor belt has a shape different from a shape of the corresponding second conveyor belt.

4. The flexible platform according to claim 1, wherein each first conveyor belt has a width different from a width of the corresponding second conveyor belt.

5. The flexible platform according to claim 1, wherein each first conveyor belt is made of a material different from a material of the corresponding second conveyor belt.

6. The flexible platform according to claim 1, further including two first conveyor belts and two second conveyors belts on each one of the sides of the central auger.

7. A flexible platform for a combined harvesting, chopping, and spinning machine comprising:

a platform having a first side and a second side;

a central auger located on the first side of the platform;

cutting blades located on the second side of the platform;

a first auger connected to a first side of the central auger;

a second auger connected to a second side of the central auger;

a first conveyor belt located on each one of the sides of the central auger;

a second conveyor belt located on each one of the sides of the central auger, each second conveyor belt is placed in parallel and adjacent to each first conveyor belt;

each second conveyor belt is rigid and moves in only one direction towards the central auger;

each first conveyor belt is flexible and moves in one direction towards the central auger and also moves at an angle in relation to the corresponding second conveyor belt; and each first conveyor belt is located between the cutting blades and the corresponding second conveyor belt.

* * * * *